United States Patent
Asakawa et al.

(10) Patent No.: US 9,664,921 B2
(45) Date of Patent: May 30, 2017

(54) OPTICAL UNIT WITH SHAKE CORRECTING FUNCTION

(75) Inventors: Shinroku Asakawa, Nagano (JP);
Shinji Minamisawa, Nagano (JP);
Tatsuki Wade, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 1109 days.

(21) Appl. No.: 13/435,099

(22) Filed: Mar. 30, 2012

(65) Prior Publication Data

US 2012/0250156 A1    Oct. 4, 2012

(30) Foreign Application Priority Data

Mar. 31, 2011    (JP) .................. 2011-077252

(51) Int. Cl.
*G02B 27/64* (2006.01)
*H02K 41/03* (2006.01)
*H04N 5/232* (2006.01)
*G03B 5/00* (2006.01)

(52) U.S. Cl.
CPC .............. *G02B 27/646* (2013.01); *G03B 5/00* (2013.01); *H02K 41/031* (2013.01); *H04N 5/2328* (2013.01); *G03B 2205/0023* (2013.01); *G03B 2205/0069* (2013.01); *H02K 2201/18* (2013.01)

(58) Field of Classification Search
CPC .... G02B 27/64; G02B 27/646–27/648; H04N 5/23248–5/23264; H04N 5/2328; H04N 5/23287; G03B 2205/0007–2205/0023; G03B 5/00–5/04

USPC .... 359/554–557; 348/208.7, 208.11, 208.99; 396/52–55
See application file for complete search history.

(56) References Cited

U.S. PATENT DOCUMENTS

| | | | | |
|---|---|---|---|---|
| 2009/0252488 | A1* | 10/2009 | Eromaki | G02B 7/102 396/529 |
| 2010/0103251 | A1* | 4/2010 | Numako | G02B 27/646 348/61 |
| 2011/0262121 | A1* | 10/2011 | Yanagisawa et al. | 396/55 |

FOREIGN PATENT DOCUMENTS

| | | |
|---|---|---|
| JP | 2010-96803 A | 4/2010 |
| WO | WO 2010044212 A1 * | 4/2010 |

* cited by examiner

*Primary Examiner* — Stephone B Allen
*Assistant Examiner* — James McGee
(74) *Attorney, Agent, or Firm* — Cantor Colburn LLP

(57) ABSTRACT

An optical unit with a shake correcting function may include a fixed body, a movable body holding an optical element, a swing support point supporting the movable body at a position between a rear end portion of the movable body and the fixed body so that the movable body is swingable, a plate-shaped spring member connected with the fixed body and the movable body on a front side for urging the movable body toward the swing support point, a shake correction drive mechanism for swinging the movable body on the front side, and a stopper mechanism in which a protruded part protruded from one of the fixed body and the movable body is capable of abutting with the other between the shake correction drive mechanism and the swing support point for determining a movable range when the movable body is displaced in a direction perpendicular to the optical axis direction.

8 Claims, 8 Drawing Sheets

OPTICAL UNIT WITH SHAKE CORRECTING FUNCTION

CROSS REFERENCE TO RELATED APPLICATION

The present invention claims priority under 35 U.S.C. §119 to Japanese Application No. 2011-077252 filed Mar. 31, 2011, the entire content of which is incorporated herein by reference.

FIELD OF THE INVENTION

At least an embodiment of the present invention may relate to an optical unit with a shake correcting function which is mounted on a cell phone with a camera or the like.

BACKGROUND

In recent years, a cell phone is structured as an optical device on which an optical unit for photographing is mounted. In the optical unit, in order to restrain disturbance of a photographed image due to a hand shake of a user, a technique has been proposed in which a movable body provided with an optical element such as a lens is supported by a fixed body through a plate-shaped spring member and, when a shake is detected, the movable body is swung in a direction for correcting the shake with a swing support point as a swing center by a magnetic drive mechanism (see Japanese Patent Laid-Open No. 2010-96803).

However, in a case of the structure in which the movable body is supported by a plate-shaped spring member, when an impact is applied to the movable body to displace the movable body in a direction perpendicular to the optical axis direction, the plate spring may be plastically deformed to be damaged and, as a result, the shake correction is unable to be performed.

SUMMARY

In view of the problem described above, at least an embodiment of the present invention may advantageously provide an optical unit with a shake correcting function which is capable of preventing damage of the spring member even when the movable body is swingably supported by the spring member.

According to at least an embodiment of the present invention, there may be provided an optical unit with a shake correcting function including a fixed body, a movable body which holds an optical element, a swing support point which supports the movable body at a position between a rear end portion in an optical axis direction of the movable body and the fixed body so that the movable body is capable of swinging, a plate-shaped spring member which is connected with the fixed body and the movable body on a front side in the optical axis direction with respect to the swing support point for urging the movable body toward the swing support point, a shake correction drive mechanism for swinging the movable body on the front side in the optical axis direction with respect to the spring member with the swing support point as a swing center, and a stopper mechanism in which a protruded part protruded from one of the fixed body and the movable body is capable of abutting with the other of the fixed body and the movable body between the shake correction drive mechanism and the swing support point in the optical axis direction for determining a movable range when the movable body is displaced in a direction perpendicular to the optical axis direction.

In the optical unit with a shake correcting function in accordance with an embodiment of the present invention, a shake correction drive mechanism for swinging the movable body is provided and thus, when a shake such as a hand shake is occurred in the optical unit, the movable body is capable of being swung to cancel the shake. Therefore, even when the optical unit is shaken, the inclination of the optical axis is capable of being corrected. Further, the stopper mechanism in which a protruded part protruded from one of the fixed body and the movable body is capable of abutting with the other is provided for determining a movable range when the movable body is displaced in a direction perpendicular to the optical axis direction. Therefore, even when an impact is applied to the movable body so that the movable body is displaced in the direction perpendicular to the optical axis direction, the movable range of the movable body is restricted and thus the spring member is prevented from being plastically deformed and damaged. Further, the protruded part (stopper mechanism) is provided between the shake correction drive mechanism and the swing support point in the optical axis direction. Therefore, the stopper mechanism is operated with a small displacement of the movable body and thus plastic deformation of the spring member can be prevented surely. In this case, it may be structured that an elastic member having a projected portion protruding toward the movable body is provided at a portion of the fixed body that is oppositely disposed to a rear end portion in the optical axis direction of the movable body, and the swing support point is structured so that the projected portion of the elastic member is abutted with the rear end portion in the optical axis direction of the movable body.

In accordance with an embodiment of the present invention, the protruded part is provided between the shake correction drive mechanism and the spring member in the optical axis direction. According to this structure, the movable range when the movable body is displaced in the direction perpendicular to the optical axis direction can be restricted further narrowly and thus plastic deformation of the spring member can be prevented further surely.

In accordance with an embodiment of the present invention, the protruded part is provided in the movable body.

In accordance with an embodiment of the present invention, the shake correction drive mechanism comprises a sheet-shaped coil body disposed on the fixed body and a permanent magnet disposed on the movable body, and the protruded part is protruded from the movable body toward the sheet-shaped coil body side with respect to the permanent magnet so as to be capable of abutting with the sheet-shaped coil body. When the magnetic drive mechanism provided with the sheet-shaped coil body and the permanent magnet is utilized as the shake correction drive mechanism, a distance between the sheet-shaped coil body and the permanent magnet is set with a high degree of accuracy and thus, when it is structured so that the protruded part is abutted with the sheet-shaped coil body, a distance between the protruded part and the sheet-shaped coil body is also set with a high degree of accuracy. Accordingly, the movable range when the movable body is displaced in the direction perpendicular to the optical axis direction is set with a high degree of accuracy and thus the movable range when the movable body is displaced in the direction perpendicular to the optical axis direction is restricted without disturbing the swing of the movable body. Specifically, it is preferable that the sheet-shaped coil body is structured so that a coil part is formed in multi-layer through an insulation film, and the protruded part is capable of abutting with a portion of the insulation film of the sheet-shaped coil body which is located at a lower side with respect to the coil part. Further, it may be structured that the movable body is formed in a rectangular shape when viewed in the optical axis direction and four outer faces of the movable body are respectively fixed with a flat plate-shaped permanent magnet, and the fixed body is formed in a rectangular shape when viewed in the optical axis direction and the sheet-shaped coil body is disposed on an inner face of a rectangular tube-shaped body part of the fixed body.

In accordance with an embodiment of the present invention, the permanent magnet is capable of abutting with the sheet-shaped coil body when the movable body is swung for determining a swingable range of the movable body. According to this structure, a stopper mechanism for determine the swingable range is not required to provide separately. Further, a distance between the sheet-shaped coil body and the permanent magnet is set with a high degree of accuracy and thus the swingable range of the movable body is set with a high degree of accuracy.

In accordance with an embodiment of the present invention, the movable body comprises a frame-shaped holder which holds the permanent magnet and a frame-shaped stopper member having the protruded part which is fixed to a rear side end face in the optical axis direction of the holder. According to this structure, the permanent magnet can be magnetized in a state that the permanent magnets have been fixed to the holder and thus handling of the permanent magnets is easy. Further, since the holder and the stopper member are discretely structured, a magnetizing process can be performed in a state before the stopper member is fixed to the holder and thus, when the magnetizing process is to be performed, the protruded part structuring the stopper mechanism does not disturb. In this case, the spring member is a plate-shaped spring member which is provided with a fixed side connecting part connected with the fixed body, a movable side connecting part connected with the frame-shaped stopper member, and a plurality of arm parts extended between the movable side connecting part and the fixed side connecting part, and the movable side connecting part is fixed to a rear side end face in the optical axis direction of the stopper member.

In accordance with an embodiment of the present invention, an inner side face of the holder and an inner side face of the stopper member are located on the same imaginary plane that is parallel to the optical axis direction. In other words, it is preferable that the stopper member is disposed with the holder to which the permanent magnet is fixed as a reference. According to this structure, positional accuracy between the stopper member and the permanent magnet can be enhanced.

In accordance with an embodiment of the present invention, the spring member is connected with the movable body through the stopper member. According to this structure, the spring member is connected with the stopper member fixed with a high degree of accuracy and thus the spring constant of the spring member can be set with a high degree of accuracy.

In accordance with an embodiment of the present invention, the movable body is formed in a rectangular shape when viewed in the optical axis direction, and the protruded part comprises a first protruded part and a second protruded part separated from the first protruded part in an extending direction of each side portion of four side portions of the quadrangular shape. According to this structure, when the stopper mechanism is operated, since a force in the twisting direction is not applied to the movable body, the spring member is prevented from being plastically deformed in the twisting direction.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

An embodiment of the present invention will be described below with reference to the accompanying drawings. In the following description, a structure for preventing a hand shake in a photographing unit will be described as an example as an optical unit. Further, in the following description, three directions perpendicular to each other are set to be an "X"-axis, a "Y"-axis and a "Z"-axis and a direction along an optical axis "L" (lens optical axis) is set to be the "Z"-axis. Further, in the following description, in the swings of the respective directions, a turning around the "X"-axis corresponds to a so-called pitching (vertical swing), a turning around the "Y"-axis corresponds to a so-called yawing (lateral swing), and a turning around the "Z"-axis corresponds to a so-called rolling. Further, "+X" is indicated on one side of the "X"-axis, "−X" is indicated on the other side, "+Y" is indicated on one side of the "Y"-axis, "−Y" is indicated on the other side, "+Z" is indicated on one side (opposite side to an object side) of the "Z"-axis, and "−Z" is indicated on the other side (object side).

Figure 1:
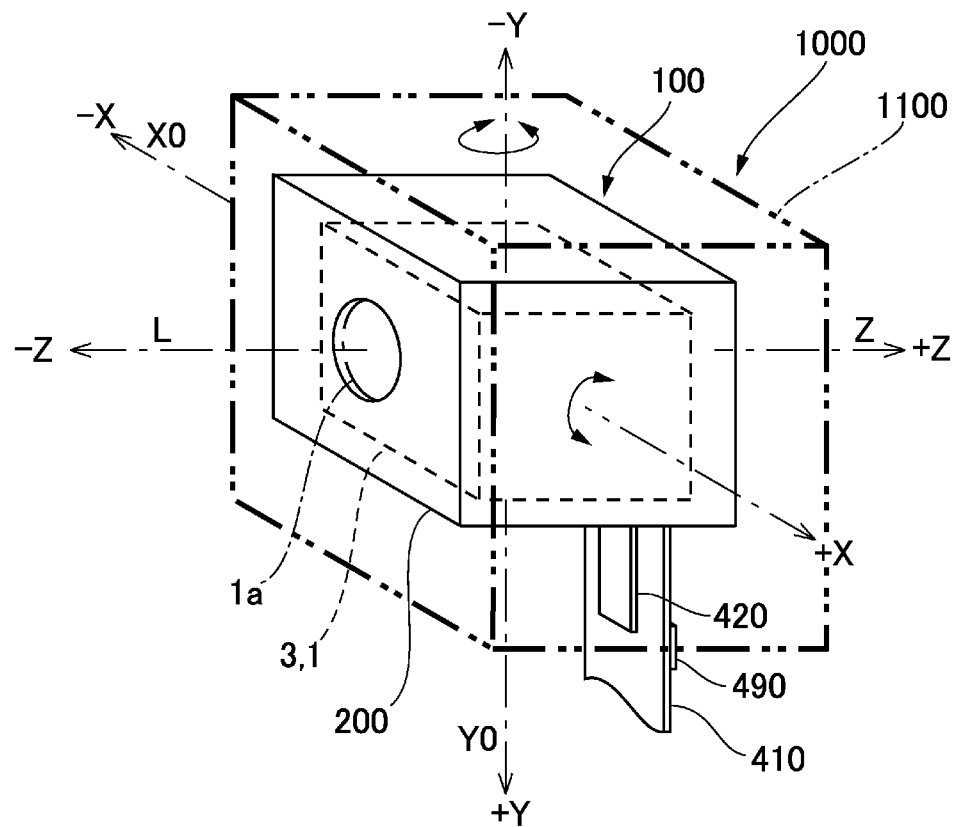
FIG. 1 is an explanatory view schematically showing a state in which an optical unit with a shake correcting function to which at least an embodiment of the present invention is applied is mounted on an optical device such as a cell phone.
Figure 2A:
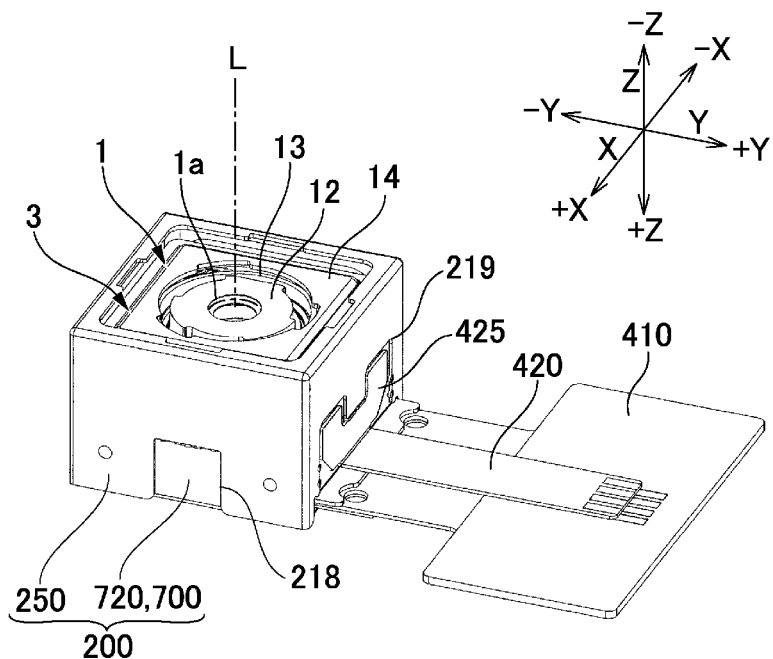
FIGS. 2(a) and 2(b) are perspective outward appearance views showing an optical unit with a shake correcting function to which at least an embodiment of the present invention is applied.
Figure 2B:
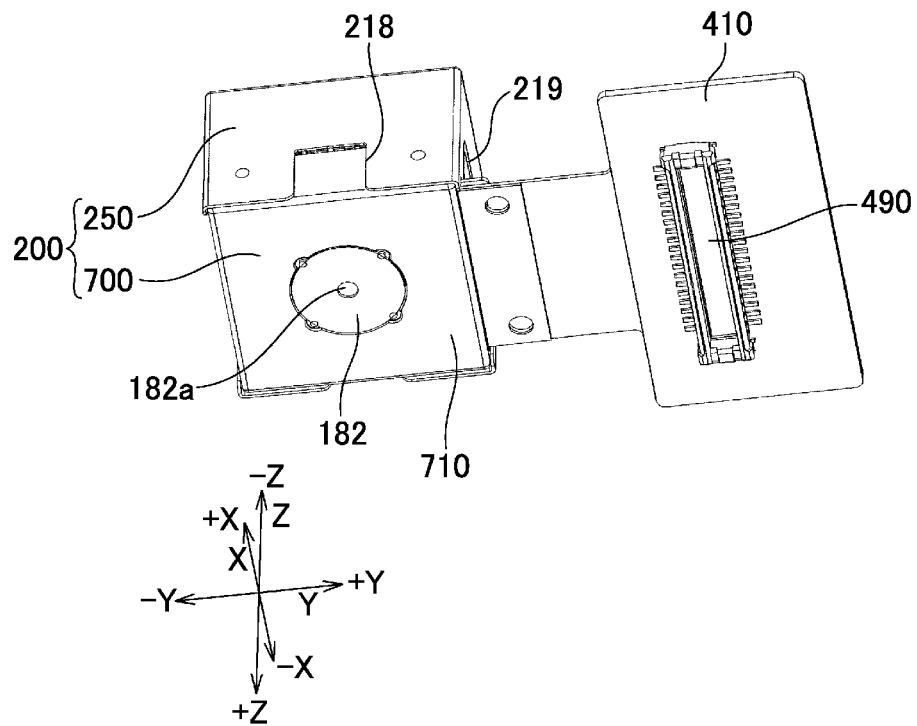
Figure 3A:
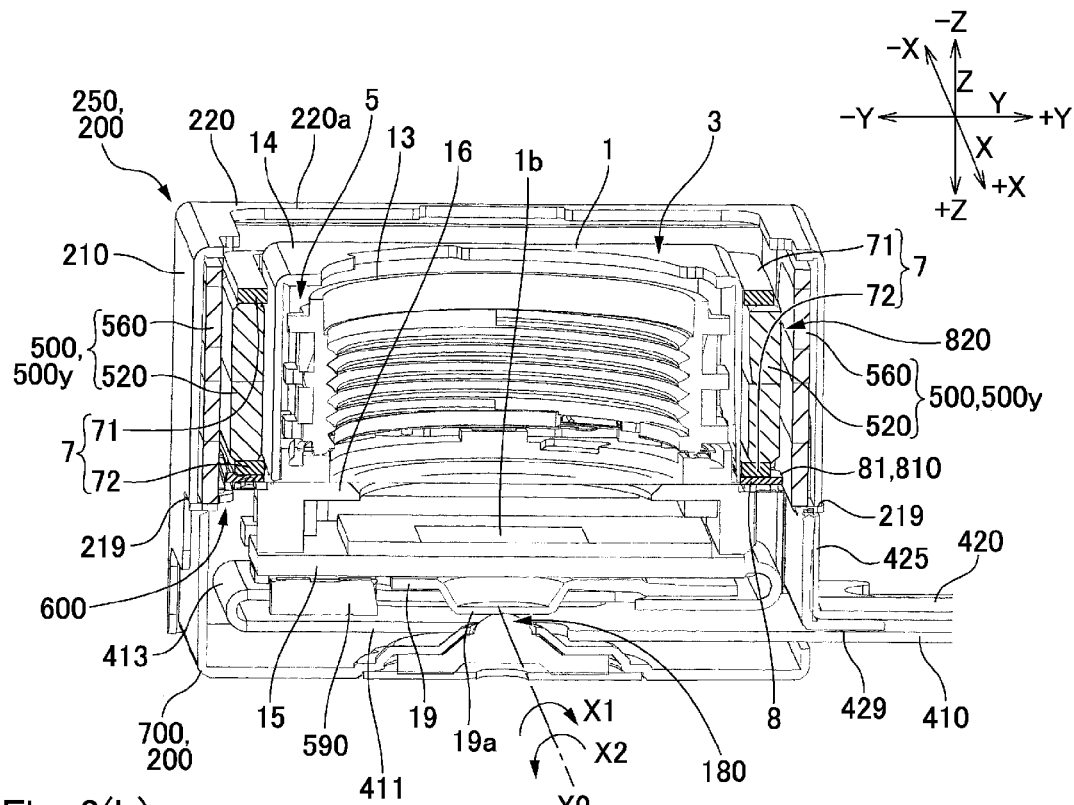
FIGS. 3(a) and 3(b) are cross-sectional views showing an optical unit with a shake correcting function to which at least an embodiment of the present invention is applied.
Figure 3B:
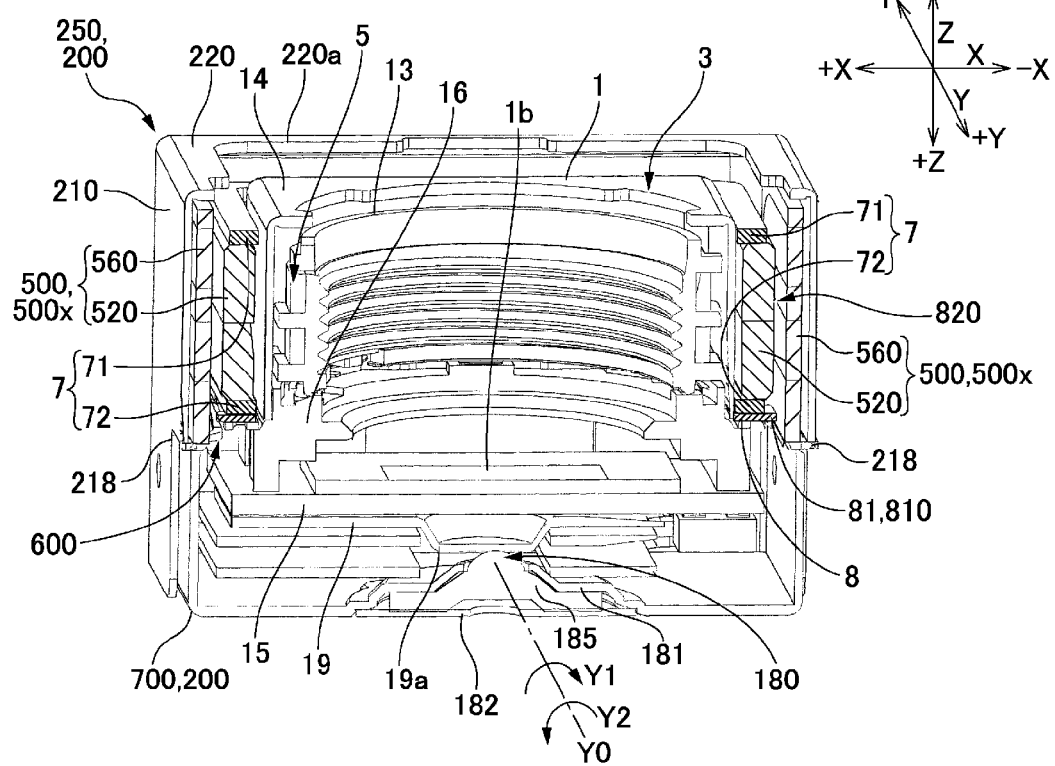

FIG. 1 is an explanatory view schematically showing a state in which an optical unit with a shake correcting function to which at least an embodiment of the present invention is applied is mounted on an optical device such as a cell phone. FIGS. 2(a) and 2(b) are perspective outward appearance views showing an optical unit with a shake correcting function to which at least an embodiment of the present invention is applied. FIG. 2(a) is a perspective view showing an optical unit which is viewed from an object side (front side in an optical axis direction) and FIG. 2(b) is a perspective view showing the optical unit which is viewed from an opposite side to the object side (rear side in the optical axis direction). FIGS. 3(a) and 3(b) are cross-sectional views showing an optical unit with a shake correcting function to which at least an embodiment of the present invention is applied. FIG. 3(a) is a "Y-Z" cross-sectional view and FIG. 3(b) is an "X-Z" cross-sectional view. In FIGS. 3(a) and 3(b), a lens holder and the like in the inside of the photographing unit are not shown.

An optical unit 100 (optical unit with a shake correcting function) shown in FIG. 1 is a thin camera which is used in an optical device 1000 such as a cell phone with a camera and is mounted in a supported state by a chassis 1110 (device main body) of the optical device 1000. In the optical unit 100, when a shake such as a hand shake is occurred in the optical device 1000 at the time of photographing, disturbance occurs in a photographed image. In order to prevent this problem, in the optical unit 100 in this embodiment, a movable body 3 provided with a photographing unit 1 is swingably supported in the inside of a fixed body 200 and a shake correction drive mechanism (not shown in FIG. 1) is provided for swinging the movable body 3 on the basis of a detected result of a hand shake by a shake detection sensor such as a gyroscope (not shown) mounted on the optical unit 100 or a gyroscope (not shown) mounted on a main body of the optical device 1000.

As shown in FIG. 1, FIGS. 2(a) and 2(b), and FIGS. 3(a) and 3(b), flexible circuit boards 410 and 420 for performing power supply to the photographing unit 1 and the shake correction drive mechanism are extended from the optical unit 100. The flexible circuit boards 410 and 420 are electrically connected with a host control section provided on the main body side of the optical device 1000 through a common connector 490 and the like. Further, the flexible circuit board 410 is also provided with a function for outputting a signal from the photographing unit 1. Therefore, the number of wiring lines in the flexible circuit board 410 is large and thus a flexible circuit board having a relatively wide width is used as the flexible circuit board 410.

The photographing unit 1 includes a case 14 in a rectangular box-like shape made of a ferromagnetic plate such as a steel plate. A holder 12 holding a lens 1a, a sleeve 13 in a cylindrical tube shape which holds the holder 12, a lens drive mechanism 5 for driving the lens 1a in a focusing direction, an imaging element 1b which is disposed on a rear side in the optical axis direction, an element holder 16 which holds the imaging element 1b, and the like are provided on an inner side of the case 14. The case 14 structures an outer peripheral portion of the photographing unit 1.

Figure 4A:
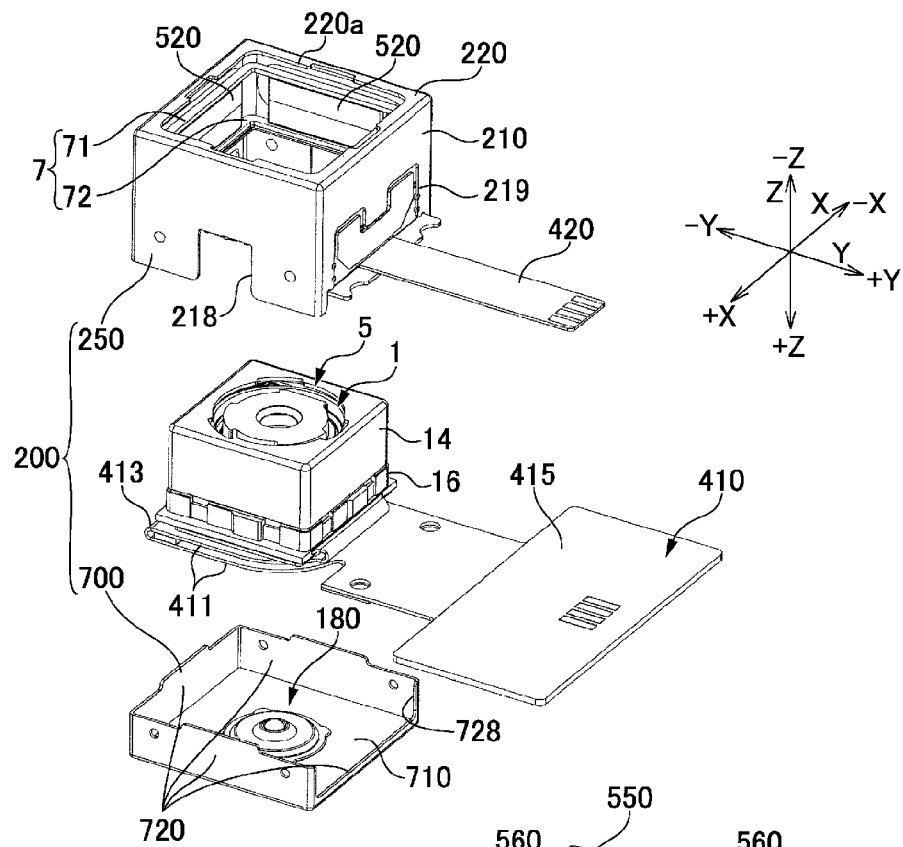
FIGS. 4(a) and 4(b) are exploded perspective views showing an optical unit with a shake correcting function to which at least an embodiment of the present invention is applied and which is viewed from an object to be photographed side.
Figure 4B:
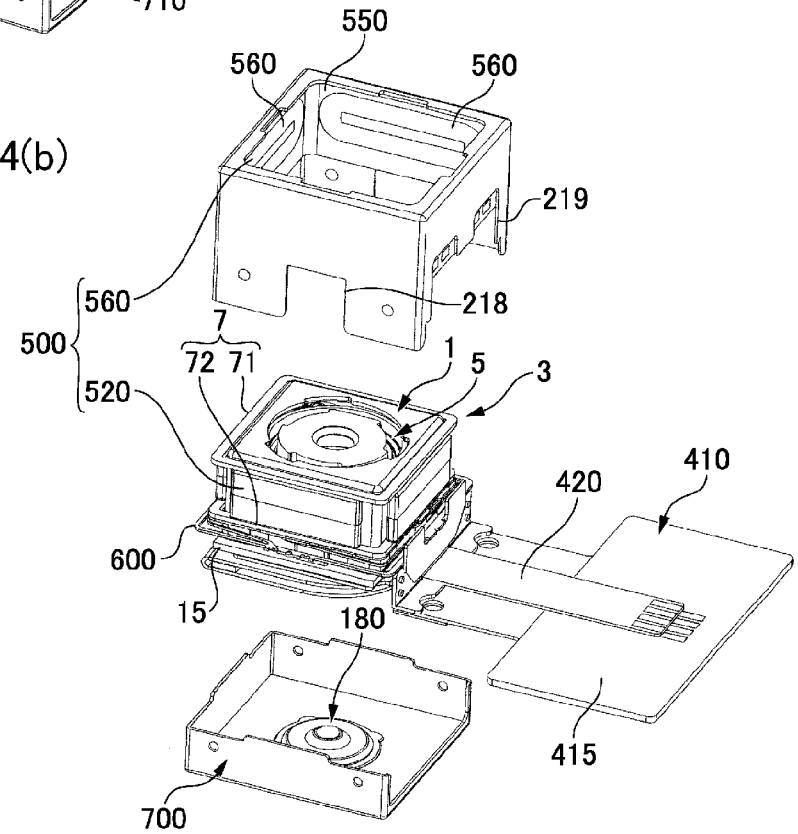
Figure 5:
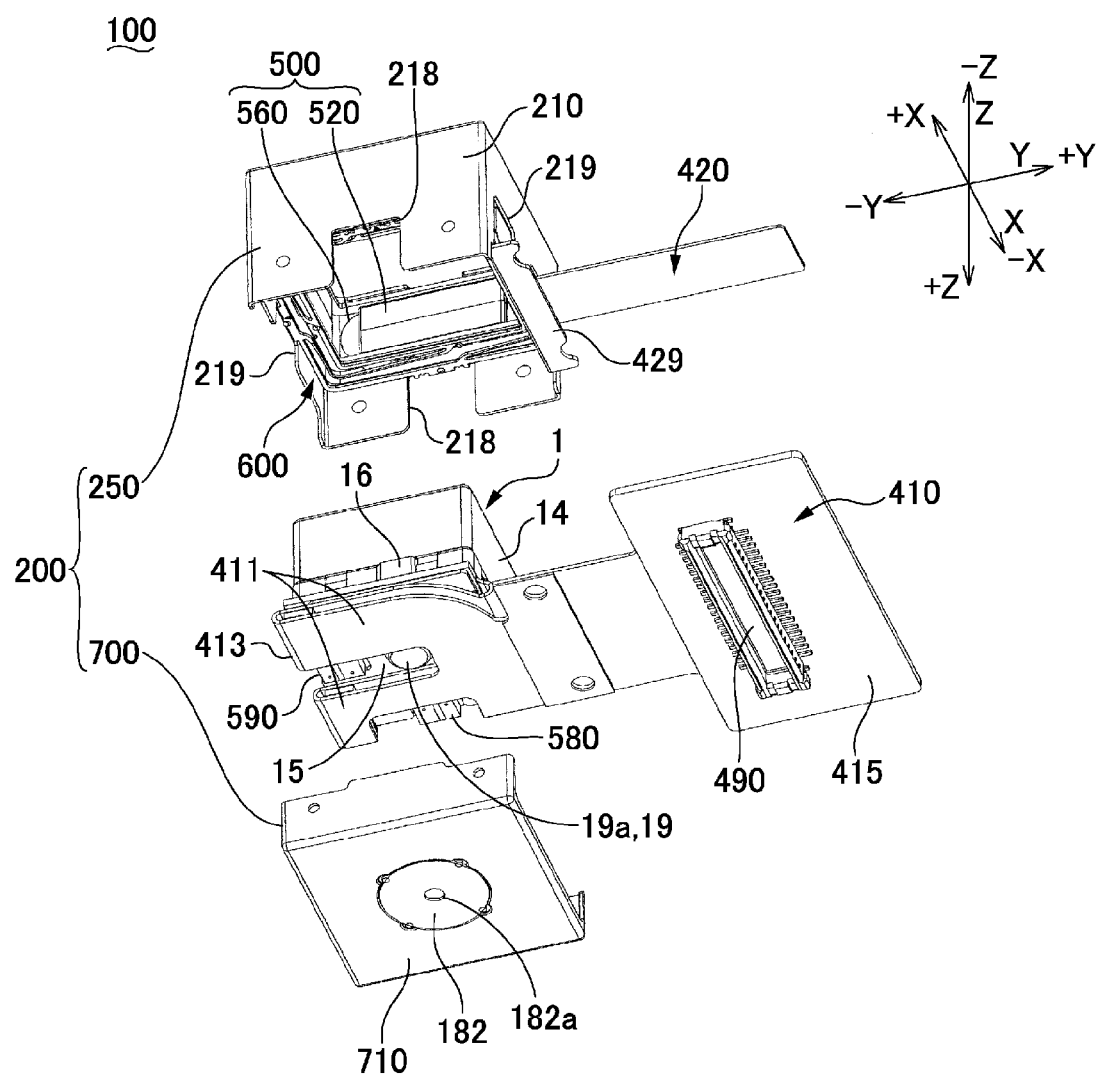
FIG. 5 is an exploded perspective view showing an optical unit with a shake correcting function to which at least an embodiment of the present invention is applied and which is viewed from an opposite side to an object to be photographed side.
Figure 6:
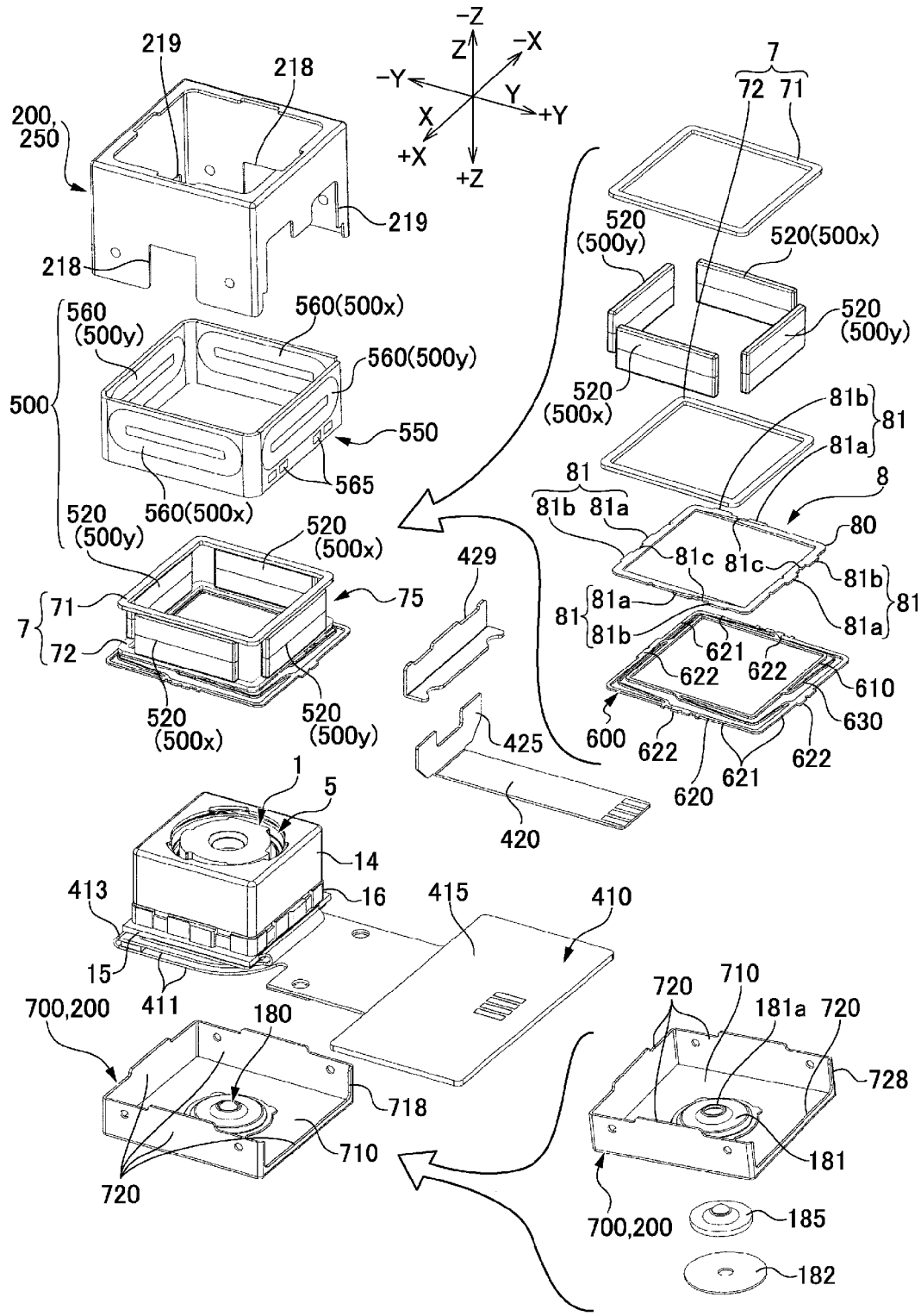
FIG. 6 is an exploded perspective view showing an optical unit with a shake correcting function to which at least an embodiment of the present invention is applied and which is further disassembled in detail.

FIGS. 4(a) and 4(b) are exploded perspective views showing the optical unit 100 with a shake correcting function to which at least an embodiment of the present invention is applied and which is viewed from an object to be photographed side. FIG. 4(a) is an exploded perspective view showing a state that the photographing unit 1 and a bottom plate part are detached from the optical unit 100, and FIG. 4(b) is an exploded perspective view showing a state that the holder and the photographing unit 1 are connected with each other to structure the movable body. FIG. 5 is an exploded perspective view showing the optical unit 100 with a shake correcting function to which at least an embodiment of the present invention is applied and which is viewed from an opposite side to an object to be photographed side. FIG. 6 is an exploded perspective view showing the optical unit 100 with a shake correcting function to which at least an embodiment of the present invention is applied and which is further disassembled in detail.

In FIGS. 3(a) and 3(b), FIGS. 4(a) and 4(b) and FIGS. 5 and 6, the optical unit 100 includes a fixed body 200, a movable body 3 provided with the photographing unit 1, a spring member 600 through which the movable body 3 is supported by the fixed body 200 so as to be capable of displacing, and a shake correction drive mechanism 500 for generating a magnetic drive force for relatively displacing the movable body 3 with respect to the fixed body 200 between the movable body 3 and the fixed body 200.

The fixed body 200 is provided with an upper cover 250, a lower cover 700 and the like, and the upper cover 250 is provided with a rectangular tube-shaped body part 210 which surrounds the photographing unit 1 and an end plate part 220 which closes an opening part on the object side of the rectangular tube-shaped body part 210. The end plate part 220 is formed with a window 220a through which light from an object to be photographed is incident. In the upper cover 250, an end part on the opposite side ("+Z" side) to the object side (side to which the optical axis is extended) of the rectangular tube-shaped body part 210 is formed to be opened. Further, in the rectangular tube-shaped body part 210, a cut-out part 218 is formed in two side faces oppositely disposed to each other in the "X" direction and a cut-out part 219 is formed in two side faces oppositely disposed to each other in the "Y" direction. The cut-out part 219 located on one side "+Y" in the "Y"-axis direction is utilized for connecting the flexible circuit board 420 with a terminal part of a sheet-shaped coil body 550 described below. Further, the cut-out part 219 is utilized for extending the flexible circuit board 410 to an outer side.

The lower cover 700 is a press-worked product of a metal plate and is provided with a bottom plate part 710 in a substantially rectangular shape and four side plate parts 720 which are stood up toward an object side from an outer circumferential edge of the bottom plate part 710. Further, in the four side plate parts 720 of the lower cover 700, the side plate part 720 located on one side "+Y" in the "Y"-axis direction is formed with a cut-out part 728, which is utilized for extending the flexible circuit board 410 to an outer side.

A swing support point 180 which will be described below is structured at a center position of the bottom plate part 710 of the lower cover 700. Further, an inner face of the bottom plate part 710 is a substantially mirror surface and is utilized as a reflection face for a first photo reflector 580 and a second photo reflector 590 which are mounted on a circuit board 15 provided at a rear side end part in the optical axis direction of the photographing unit 1. The lower cover 700 is, for example, a metal member which is non-magnetized by heat treatment. More specifically, the lower cover 700 is a metal plate in which metal material such as "SUS 304" is performed with a bending work or a drawing work in a predetermined shape. When a bending work or a drawing work is performed on "SUS 304" or the like, a part of austenite is transferred to martensite to be provided with a magnetic property. However, in this embodiment, heat treatment is performed on the lower cover 700 after a bending work or a drawing work. Therefore, when the optical unit 100 is to be assembled, attraction between the permanent magnets 520 and the lower cover 700 is prevented. Further, when heat treatment is performed on metal material such as "SUS 304", the reflectivity of the metal material becomes higher and thus the lower cover 700 is provided with a sufficient reflectivity for utilizing as a reflection face for the first photo reflector 580 and the second photo reflector 590. In accordance with an embodiment of the present invention, the lower cover 700 may be made of nonmagnetic material itself such as aluminum, copper, copper alloy (for example, brass or nickel silver) in addition to "SUS 304", or the above-mentioned material which is performed with metal plating.

In the optical unit 100 in this embodiment, the movable body 3 is structured of the photographing unit 1, a holder 7 in a rectangular frame shape which surrounds an outer peripheral face of the case 14 of the photographing unit 1, and a stopper member 8 which will be described below. The stopper member 8 is fixed to a face on the rear side in the optical axis direction of the holder 7 by a method such as welding. The holder 7 includes a first holder member 71 in a rectangular frame shape which is located on the front side in the optical axis direction and a second holder member 72 in a rectangular frame shape which is located on the rear side in the optical axis direction so as to face the first holder member 71. In this embodiment, flat plate-shaped permanent magnets 520 which are used in the shake correction drive mechanism 500 are held between the first holder member 71 and the second holder member 72. More specifically, the first holder member 71 is fixed to the front side faces in the optical axis direction of the permanent magnets 520 and the second holder member 72 is fixed to the rear side faces in the optical axis direction of the permanent magnets 520. A rectangular tube-shaped permanent magnet assembly 75 is structured of the permanent magnets 520, the first holder member 71 and the second holder member 72. Therefore, after the photographing unit 1 is inserted to an inner side of the rectangular tube-shaped permanent magnet assembly 75, an outer peripheral face of the case 14 of the photographing unit 1 and an inner peripheral face of the permanent magnet assembly 75 (inner faces of the permanent magnets 520) are fixed to each other by an adhesive 73 (see FIGS. 7(*b*) and 7(*c*)) or the like and, as a result, the permanent magnets 520, the first holder member 71, the second holder member 72, the stopper member 8 and the photographing unit 1 are integrated with each other to structure the movable body 3.

The spring member 600 is a plate-shaped spring member which is provided with a fixed side connecting part 620 connected with the fixed body 200, a movable side connecting part 610 connected with the movable body 3, and a plurality of arm parts 630 which are extended between the movable side connecting part 610 and the fixed side connecting part 620. Both ends of the arm part 630 are respectively connected with the movable side connecting part 610 and the fixed side connecting part 620. The fixed side connecting part 620 is provided with a main body portion 621 in a rectangular frame shape and protruded parts 622 which are protruded to outer sides from center positions of respective side parts of the main body portion 621.

In order to connect the spring member 600 with the movable body 3 and the fixed body 200, in this embodiment, the movable side connecting part 610 is fixed to a rear side end face in the optical axis direction of the stopper member 8 by a method such as welding. Further, the fixed side connecting part 620 is fixed to an upper end part of the side plate part 720 of the lower cover 700 by a method such as welding in a state that the protruded parts 622 are fitted in the cut-out parts 218 and 219 of the upper cover 250. The spring member 600 is made of nonmagnetic metal such as beryllium copper or nonmagnetic SUS steel material and is formed by performing a press working or etching processing using a photo lithography technique on a thin plate having a certain thickness.

In this embodiment, when the movable side connecting part 610 of the spring member 600 is connected with the movable body 3 and the fixed side connecting part 620 is fixed to the fixed body 200, the movable body 3 becomes in a state that the movable body 3 is pushed to the front side in the optical axis direction by the swing support point 180. Therefore, the movable side connecting part 610 of the spring member 600 is in a state that the movable side connecting part 610 is pushed to the front side in the optical axis direction with respect to the fixed side connecting part 620 and thus the arm parts 630 of the spring member 600 urges the movable body 3 to the rear side in the optical axis direction. Accordingly, the movable body 3 is in a state that the movable body 3 is urged toward the swing support point 180 by the spring member 600 and thus the movable body 3 is in a supported state by the fixed body 200 so as to be capable of being swung through the swing support point 180.

As shown in FIGS. 3(*a*) and 3(*b*), FIG. 6 and the like, in the optical unit 100 in this embodiment, the shake correction drive mechanism 500 is structured of a coil part 560 and permanent magnets 520 for generating a magnetic field interlinking with the coil part 560. More specifically, a flat plate-shaped permanent magnet 520 is fixed to four outer faces of the case 14 of the movable body 3 and the coil part 560 is disposed on an inner face of the rectangular tube-shaped body part 210 of the upper cover 250. The permanent magnet 520 is magnetized so that the pole of its inner side face and the pole of its outer side face are different from each other. Further, the permanent magnet 520 is comprised of two magnet pieces disposed in the optical axis "L" direction and the magnet pieces are magnetized so that the poles of faces oppositely disposed to the coil part 560 are different from each other in the optical axis direction. Further, the coil part 560 is formed in a quadrangular frame shape and its upper and lower long side portions are utilized as an effective side.

In the permanent magnets 520 and the coil parts 560, the permanent magnets 520 and the coil parts 560 disposed at two parts so as to interpose the movable body 3 from both sides in the "Y"-axis direction structure a "Y"-side shake correction drive mechanism 500*y* and, as shown by the arrows "X1" and "X2" in FIG. 3(*a*), the movable body 3 is swung with the axial line "X0" extending in the "X"-axis direction passing through the swing support point 180 as a swing center. Further, the permanent magnets 520 and the coil parts 560 disposed at two parts so as to interpose the photographing unit 1 from both sides in the "X"-axis direction structure an "X"-side shake correction drive mechanism 500*x* and, as shown by the arrows "Y1" and "Y2" in FIG. 3(*b*), the movable body 3 is swung with the axial line "Y0" extending in the "Y"-axis direction passing through the swing support point 180 as a swing center.

In order to structure the "Y"-side shake correction drive mechanism 500y and the "X"-side shake correction drive mechanism 500x, in this embodiment, a sheet-shaped coil body 550 is used so as to be extended along the inner face of the upper cover 250 and four coil parts 560 are integrally formed in the sheet-shaped coil body 550 with a predetermined distance therebetween. Further, the sheet-shaped coil body 550 is provided with a shape extended in a belt-like shape when developed and the sheet-shaped coil body 550 is fixed to the inner face of the upper cover 250 by a method such as surface bonding in a state that the sheet-shaped coil body 550 is bent along the inner face of the upper cover 250.

The sheet-shaped coil body 550 is structured so that the coil part 560 made of a minute copper wiring line is formed on a circuit board by utilizing an electric conduction wiring technique. A plurality of copper wiring layers (coil part 560) is formed in a multi-layer structure through an insulation film. Further, the surface of the copper wiring line (coil part 560) is covered with an insulation film. For example, an FP coil (fine pattern coil (registered mark)) made by ASAHI KASEI ELECTRONICS CO., LTD. may be used as the sheet-shaped coil body 550.

In this embodiment, a plurality of terminal parts 565 is formed in the sheet-shaped coil body 550 by using an electrically conducting layer extended from four coil parts 560. In this embodiment, the terminal parts 565 are disposed on an outer side of the sheet-shaped coil body 550 which is opposite to the inner side facing the permanent magnet 520. Further, the cut-out part 219 is formed in the portion of the upper cover 250 which is overlapped with the terminal parts 565. Therefore, since the terminal parts 565 of the sheet-shaped coil body 550 are exposed to the outer side, the sheet-shaped coil body 550 and an end part 425 of the flexible circuit board 420 which is bent toward the direction of the optical axis "L" are electrically connected with each other through the cut-out part 219 by soldering or the like. In this embodiment, a bent portion of the end part 425 of the flexible circuit board 420 is reinforced by a plate 429.

In this embodiment, as described above, since the sheet-shaped coil body 550 is used, in comparison with a case that discrete air-core coils are separately used, a distance between the photographing unit 1 and the fixed body 200 can be narrowed and thus the size of the optical unit 100 can be made small. Further, in the case of the sheet-shaped coil body 550, since a plurality of the coil parts 560 is integrally provided together with the terminal parts 565, even when a plurality of coil parts 560 are required to be disposed around the optical axis "L", the sheet-shaped coil body 550 can be extended around the optical axis "L". Therefore, different from a case that discrete air-core coils are separately used, discrete air-core coils are not required to be disposed at plural positions around the optical axis "L" and discrete air-core coils are not required to be electrically connected and thus, according to this embodiment, assembly man-hours are reduced. Further, the terminal parts 565 of the sheet-shaped coil body 550 are disposed on the outer side which is an opposite side to the permanent magnet 520 and thus electrical connection with the coil parts 560, in other words, connection of the flexible circuit board 420 to the terminal parts 565 can be performed easily.

Figure 7A:
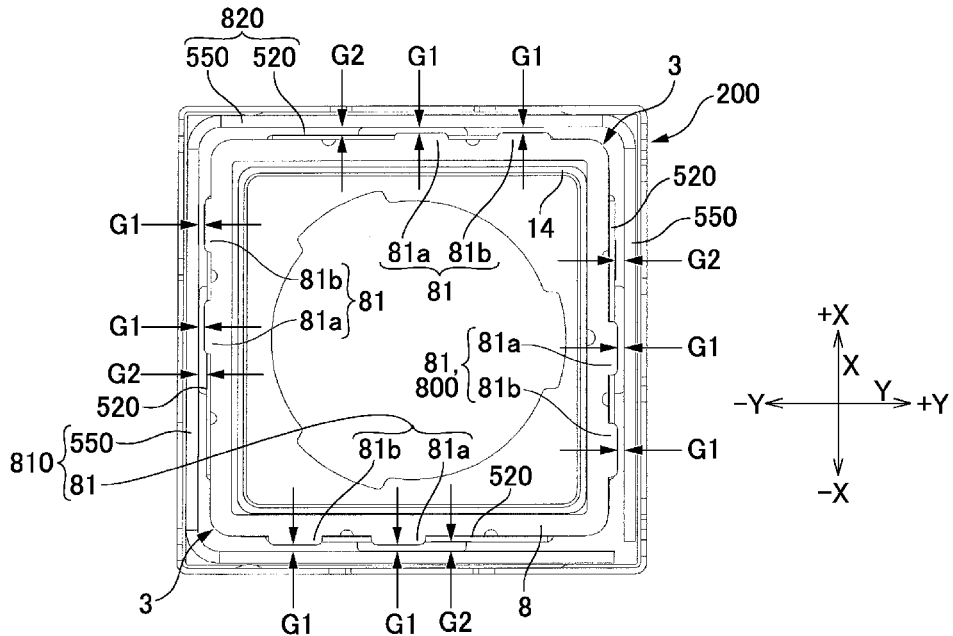
FIGS. 7(a), 7(b) and 7(c) are explanatory views showing a stopper mechanism of an optical unit with a shake correcting function to which at least an embodiment of the present invention is applied.
Figure 7B:
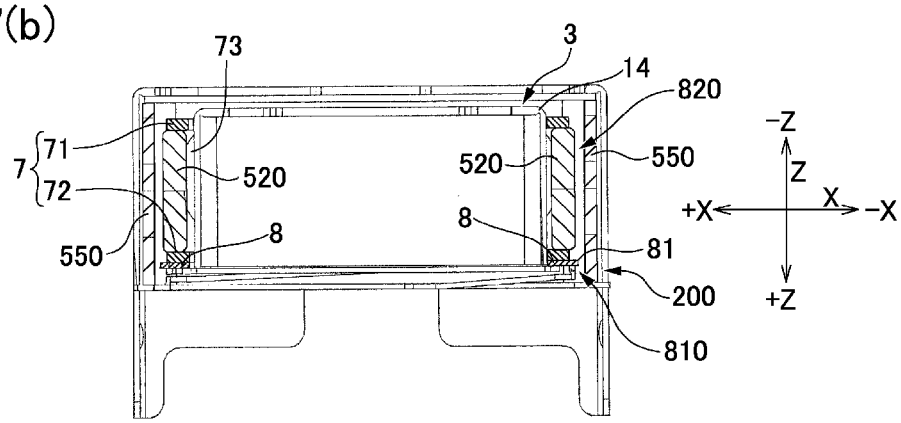
Figure 7C:
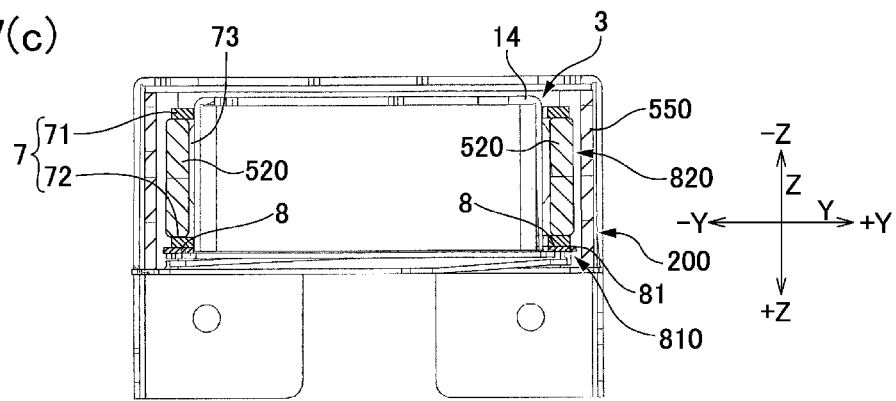

FIGS. 7(a), 7(b) and 7(c) are explanatory views showing a stopper mechanism of the optical unit 100 with a shake correcting function to which at least an embodiment of the present invention is applied. FIG. 7(a) is a bottom view showing structural members structuring the stopper mechanism of the optical unit 100 which is viewed from the rear side in the optical axis direction, FIG. 7(b) is its "X-Z" cross-sectional view, and FIG. 7(c) is its "Y-Z" cross-sectional view.

In the optical unit 100 in this embodiment, the movable body 3 is supported by the fixed body 200 in a state that the movable body 3 is capable of swinging by the swing support point 180. Therefore, when a large force is applied from the outside to largely swing the photographing unit 1, the arm parts 630 of the spring member 600 may be plastically deformed. In order to prevent this problem, in this embodiment, a stopper mechanism which will be described below is provided.

In this embodiment, as shown in FIG. 6 and FIGS. 7(a), 7(b) and 7(c), a stopper member 8 in a rectangular frame shape is fixed to the rear side end face in the optical axis direction of the holder 7 of the movable body 3 by a method such as welding. An inner face of the holder 7 (an inner face of the first holder member 71 and an inner face of the second holder member 72) and an inner face of the stopper member 8 are located on the same plane that is parallel to the optical axis and the stopper member 8 is disposed with the inner face of the holder 7 as a reference. Therefore, positional accuracy between the stopper member 8 and the permanent magnet 520 is enhanced. Further, the outer face of the permanent magnet 520 is disposed with the inner face of the holder 7 as a reference by a jig (not shown) or the like with a high degree of accuracy. Therefore, even when variation of a thickness of the permanent magnet 520 is occurred, a distance between the permanent magnet 520 and the sheet-shaped coil body 550 can be set with a high degree of accuracy.

In accordance with an embodiment of the present invention, when thickness accuracy of the permanent magnet 520 is high, it may be structured that the inner side face of the permanent magnet 520 and the inner side face of the stopper member 8 are located on the same plane that is parallel to the optical axis. In this case, the stopper member 8 and the permanent magnet 520 are disposed with the same mounting tolerance and thus the stopper member 8 and the permanent magnet 520 are disposed with a high degree of positional accuracy.

Further, the stopper member 8 is provided with a main body portion 80 in a rectangular frame shape and a protruded part 81 which is protruded to an outer side from the main body portion 80 and the protruded part 81 is protruded to an outer side with respect to the permanent magnet 520. In this embodiment, the protruded part 81 is formed in each of four side portions of the main body portion 80. Further, the protruded part 81 is comprised of a first protruded part 81a and a second protruded part 81b provided at a position separated from the first protruded part 81a in an extending direction of the side portion in each of the four side portions of the main body portion 80. A small recessed part 81c which is utilized when the stopper member 8 is to be fixed to the holder 7 by welding or the like is formed between the first protruded part 81a and the second protruded part 81b. In this embodiment, the protruded part 81 is disposed at a displaced position from the center of the side portion in the same circumferential direction in each of the four side portions of the main body portion 80 and the protruded parts 81 are located at point-symmetrical positions on the side portions oppositely disposed to each other. In this embodiment, a portion of the stopper member 8 which correspond between the first protruded part 81a and the second protruded part 81b is fixed to the rear side end face in the optical axis direction of the holder 7 by a method such as welding.

The protruded part 81 faces the sheet-shaped coil body 550 which is provided on the fixed body 200 through a narrow gap space "G1". Therefore, the protruded part 81 and the sheet-shaped coil body 550 structure a stopper mechanism 810 which determines a movable range when the movable body 3 is displaced in a direction perpendicular to the optical axis direction between the shake correction drive mechanism 500 and the swing support point 180 in the optical axis direction. More specifically, the protruded part 81 and the sheet-shaped coil body 550 structure a stopper mechanism 810 which determines a movable range when the movable body 3 is displaced in a direction perpendicular to the optical axis direction between the shake correction drive mechanism 500 and the spring member 600 between the shake correction drive mechanism 500 and the swing support point 180 in the optical axis direction.

In a case of the sheet-shaped coil body 550, different from an air-core coil, a wound coil is not loosened even when the coil is abutted with the permanent magnet 520. A portion with which the protruded part 81 is abutted may be either of a portion of the sheet-shaped coil body 550 where the coil part 560 is structured and a portion where the coil part 560 is not structured. However, in this embodiment, a portion with which the protruded part 81 is abutted is structured to be a portion of the sheet-shaped coil body 550 where the coil part 560 is not structured. Specifically, in the sheet-shaped coil body 550, the coil part 560 is disposed so as to face the permanent magnet 520 and a portion of only the insulation film where the coil part 560 is not structured is disposed on the lower side of the coil part 560. On the other hand, the stopper member 8 having the protruded part 81 is fixed to the rear side end face in the optical axis direction of the second holder member 72 which holds the permanent magnet 520. Therefore, when the portion structured of only the insulation film in the sheet-shaped coil body 550 is formed wider to be extended to the lower side, the protruded part 81 can be abutted with the portion on the lower side with respect to the coil part 560 of the sheet-shaped coil body 550.

Further, the sheet-shaped coil body 550 and the permanent magnet 520 are oppositely disposed to each other through a narrow gap space "G2" and the gap space "G2" is a slightly larger than the gap space "G1" between the protruded part 81 and the sheet-shaped coil body 550. Therefore, the sheet-shaped coil body 550 and the permanent magnets 520 structure a stopper mechanism 820 which determines a swingable range when the movable body 3 is swung. A portion of the sheet-shaped coil body 550 with which the permanent magnets 520 are capable of being abutted may be either of a portion where the coil part 560 is structured and a portion where the coil part 560 is not structured. However, in this embodiment, a portion of the sheet-shaped coil body 550 with which the permanent magnets 520 are to be abutted is set to be a portion where the coil part 560 is structured. According to this stopper mechanism 820, a swingable range of the movable body 3 can be set with a high degree of accuracy. In other words, in the shake correction drive mechanism 500, a distance between the sheet-shaped coil body 550 and the permanent magnet 520 is set with a high degree of accuracy and thus, when the stopper mechanism 820 is structured by utilizing the sheet-shaped coil body 550 and the permanent magnet 520, a swingable range of the movable body 3 is set with a high degree of accuracy.

As described above, in this embodiment, the protruded part 81 protruded from one of the fixed body 200 and the movable body 3 is capable of being abutted with the other of the fixed body 200 and the movable body 3 and, in this manner, the stopper mechanism 810 is provided for determining the movable range when the movable body 3 is displaced in the direction perpendicular to the optical axis direction. More specifically, in this embodiment, the stopper mechanism 810 is provided for determining the movable range when the movable body 3 is displaced in the direction perpendicular to the optical axis direction by abutting the protruded part 81 protruded from the movable body 3 with the fixed body 200 side. Therefore, even when an impact is applied to the movable body 3 to displace the movable body 3 in the direction perpendicular to the optical axis direction, the movable range of the movable body 3 is restricted. Accordingly, the spring member 600 is prevented from being plastically deformed and damaged. Further, the protruded part 81 (stopper mechanism 810) is provided between the shake correction drive mechanism 500 and the swing support point 180 in the optical axis direction. Therefore, for example, in comparison with a case that the protruded part 81 is provided on the front side with respect to the shake correction drive mechanism 500 in the optical axis direction at a position separated from the swing support point 180, the stopper mechanism 810 is operated with a little displaced amount of the movable body 3. Accordingly, the plastic deformation of the spring member 600 is prevented surely.

Further, the protruded part 81 (stopper mechanism 810) is provided between the shake correction drive mechanism 500 and the spring member 600 in the optical axis direction. Therefore, the movable range when the movable body 3 is displaced in the direction perpendicular to the optical axis direction is restricted further narrow and thus the plastic deformation of the spring member 600 is prevented further surely.

Further, the protruded part 81 is protruded from the movable body 3 to the sheet-shaped coil body 550 side with respect to the permanent magnet 520 so as to be capable of being abutted with the sheet-shaped coil body 550. Therefore, the movable range when the movable body 3 is displaced in the direction perpendicular to the optical axis direction can be set with a high degree of accuracy and thus the movable range when the movable body 3 is displaced in the direction perpendicular to the optical axis direction is restricted without disturbing the swing of the movable body 3. In other words, in the shake correction drive mechanism 500, a distance between the sheet-shaped coil body 550 and the permanent magnet 520 is set with a high degree of accuracy and thus, when it is structured so that the protruded part 81 is to be abutted with the sheet-shaped coil body 550, a distance between the protruded part 81 and the sheet-shaped coil body 550 is also set with a high degree of accuracy. Accordingly, the movable range when the movable body 3 is displaced in the direction perpendicular to the optical axis direction is set with a high degree of accuracy. In accordance with an embodiment of the present invention, it is preferable that the sheet-shaped coil body 550 is used in order to make a distance between the coil part and the permanent magnet as narrow as possible but a normal air-core coil may be used. However, in this case, the protruded part 81 is required to be abutted with a portion except the coil part.

Further, the movable body 3 includes the frame-shaped holder 7 which holds the permanent magnets 520 and the frame-shaped stopper member 8 having the protruded parts 81 which is fixed to the rear side end face in the optical axis direction of the holder 7. Therefore, the permanent magnet 520 can be magnetized in a state that the permanent magnet 520 is fixed to the holder 7 but the stopper member 8 is not fixed and thus handling of the permanent magnet 520 is easy.

Further, since the holder 7 and the stopper member 8 are discretely structured, a magnetizing process can be performed in a state before the stopper member 8 is fixed to the holder 7 and thus, when the magnetizing process is to be performed, the protruded part 81 structuring the stopper mechanism 810 does not disturb. Therefore, the magnetizing can be performed without requiring an unnecessary gap space between the permanent magnet 520 and the magnetizing head.

Further, the inner face of the holder 7 (the inner face of the first holder member 71 and the inner face of the second holder member 72) to which the permanent magnets 520 are fixed and the inner face of the stopper member 8 are located on the same plane that is parallel to the optical axis. In other words, the stopper member 8 is disposed with the inner face of the holder 7 as a reference. Therefore, positional accuracy between the stopper member 8 and the permanent magnet 520 can be enhanced.

Further, a connected portion of the spring member 600 with the movable body 3 is the stopper member 8. Therefore, since the spring member 600 is connected with the stopper member 8 which is fixed with a high degree of accuracy, the spring constant of the spring member 600 can be set with a high degree of accuracy.

Further, the protruded part 81 is provided as the first protruded part 81a and the second protruded part 81b which are separated from each other in each of four side portions of a quadrangular shape. Therefore, even when a force in a twisting direction is applied to the movable body 3, in comparison with a case that only one protruded part 81 is provided in each of the side portions, either one of the first protruded part 81a and the second protruded part 81b is operated as the stopper mechanism 810. Accordingly, since a force in the twisting direction is not applied to the movable body 3, the spring member 600 is prevented from being plastically deformed in the twisting direction.

Figure 8A:
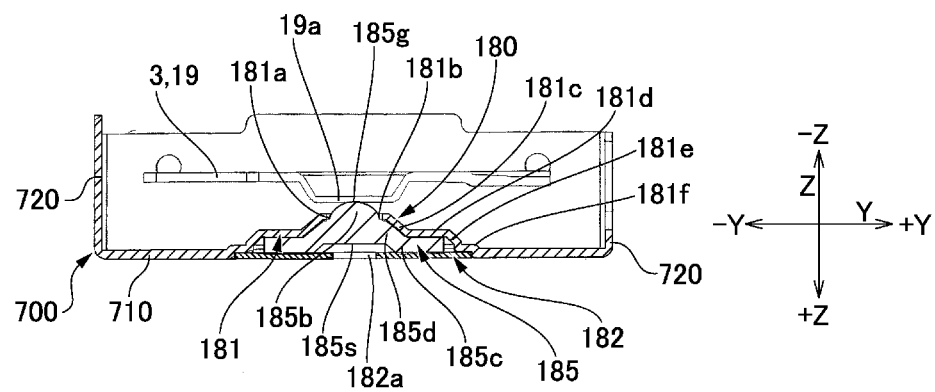
FIGS. 8(a) and 8(b) are explanatory views showing a swing support point of an optical unit with a shake correcting function to which at least an embodiment of the present invention is applied.
Figure 8B:
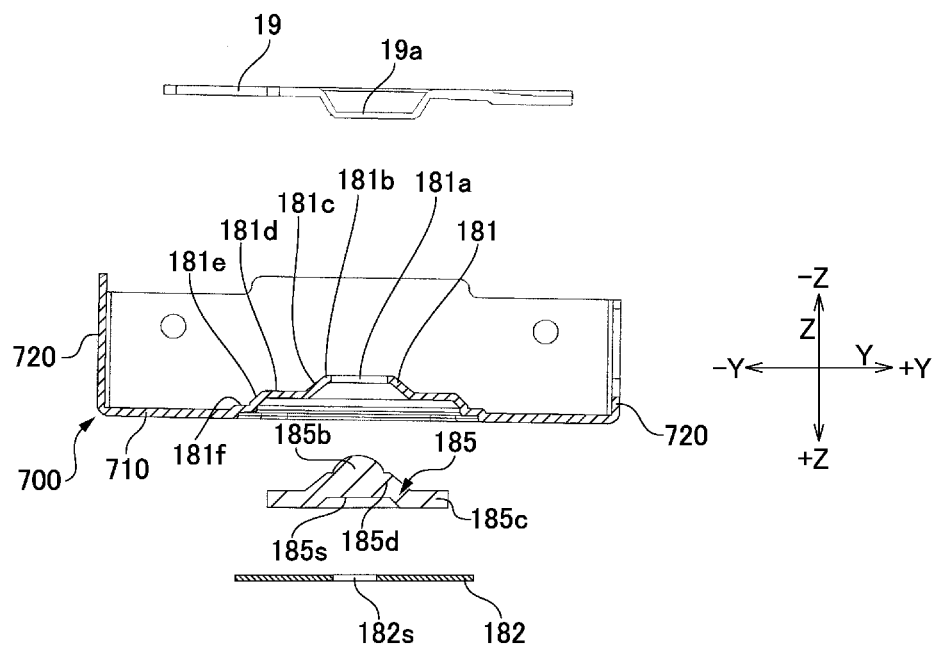

FIGS. 8(a) and 8(b) are explanatory views showing a swing support point of the optical unit 100 with a shake correcting function to which at least an embodiment of the present invention is applied. FIG. 8(a) is a "Y-Z" cross-sectional view showing the swing support point and the like and FIG. 8(b) is an explanatory view showing structural members structuring the swing support point.

On one side "+Z" of the "Z"-axis (opposite side to the object side) with respect to the photographing unit 1, the swing support point 180 for swinging the photographing unit 1 is provided between the photographing unit 1 and the lower cover 700 of the fixed body 200. The photographing unit 1 is urged toward the lower cover 700 by the spring member 600 through the swing support point 180.

In this embodiment, a portion of the fixed body 200 which is oppositely disposed to the rear end portion in the optical axis direction of the photographing unit 1 is provided with a first plate part 181 in which a hole 181a is formed, an elastic member 185 made of elastomer which is disposed so as to be superposed on the first plate part 181 on the rear side in the optical axis direction, and a second plate part 182 which is disposed so as to be superposed on the elastic member 185 on the rear side in the optical axis direction. The second plate part 182 holds the elastic member 185 in a compressed state between the first plate part 181 and the second plate part 182. In this embodiment, the first plate part 181 is comprised of a bottom plate portion in a recessed shape which is recessed toward the front side in the optical axis direction from a center portion of the bottom plate part 710 of the lower cover 700. The second plate part 182 is a circular support plate which is attached to the bottom plate part 710 of the lower cover 700 by welding or the like and a small hole 182a is formed at its center.

The elastic member 185 is formed in a roughly disk-like shape and its front side face in the optical axis direction is provided with a protruded part 185b, which is protruded in a hemispherical shape toward the front side in the optical axis direction at a position overlapping with the hole 181a, and a ring shaped flange part 185c which is enlarged around the protruded part 185b. The flange part 185c is held between the first plate part 181 and the second plate part 182. Further, the elastic member 185 is provided with a thick wall part 185d between the protruded part 185b and the flange part 185c and a circular recessed part 185s is formed at a center of the rear side face in the optical axis direction.

The first plate part 181 is provided with a circular bottom part 181b formed with the hole 181a, an inclined part 181c comprised of a conical face surrounding the bottom part 181b, a ring shaped flat plate part 181d which is enlarged from the inclined part 181c, an inclined part 181e comprised of a conical face surrounding the flat plate part 181d, and a ring shaped flat plate part 181f which is enlarged from the inclined part 181e. The second plate part 182 (support plate) is superposed on and fixed to the flat plate part 181f by welding or the like. In this state, the inclined part 181c and the flat plate part 181d of the first plate part 181 are abutted with the thick wall part 185d and the flange part 185c of the elastic member 185 to hold the elastic member 185 between the second plate part 182 and the first plate part 181.

As a result, a part of the protruded part 185b of the elastic member 185 is protruded in a hemispherical manner to the front side in the optical axis direction from the hole 181a of the first plate part 181 and a projected portion 185g is abutted with the rear side end face in the optical axis direction of the photographing unit 1 as a pivot portion of the swing support point 180. In this embodiment, a portion of the photographing unit 1 with which the swing support point 180 is abutted is a portion 19a which is bent so as to protrude toward the rear side in the optical axis direction from the supporting plate 19 which is fixed to the rear side face in the optical axis direction of the circuit board 15.

In this embodiment, as described above, the portion of the fixed body 200 which is oppositely disposed to the rear end portion in the optical axis direction of the movable body 3 is provided with the first plate part 181 in which the hole 181a is formed, the elastic member 185 made of elastomer which is superposed and disposed on the rear side in the optical axis direction of the first plate part 181, and the second plate part 182 which is superposed and disposed on the rear side in the optical axis direction of the elastic member 185. The swing support point 180 is structured of the projected portion 185g of the elastic member 185 which is protruded to the movable body 3 through the hole 181a. Therefore, when an impact directing toward the rear side in the optical axis direction is applied to the movable body 3, since the impact is absorbed by the projected portion 185g of the elastic member 185, the bottom plate part 710 of the lower cover 700 (fixed body 200) is not deformed. Further, unnecessary vibration applied to the movable body 3 during control of a shake correction can be absorbed by the elastic member 185 and thus occurrence of resonance can be prevented. In addition, in a case that the swing support point 180 is structured of a simple rubber product, control of its height dimension may be difficult. However, since the elastic member 185 is sandwiched by two plate parts (first plate part 181 and second plate part 182), the height dimension of the swing support point 180 can be secured with a sufficient degree of accuracy.

Further, the first plate part 181 is a bottom plate part 710 of the lower cover 700 (fixed body 200) and the second plate part 182 is a support plate which is fixed to the bottom plate part 710. Therefore, the elastic member 185 and the second plate part 282 (support plate) are successively superposed on the bottom plate part 710 of the lower cover 700 and thus assembling can be performed easily.

Further, the elastic member 185 is provided with the flange part 185*c* which is held between the first plate part 181 and the second plate part 182 around the hole 181*a* and the protruded part 185*b* which is protruded from the flange part 185*c* toward the inside of the hole 181*a* and thus rattling of the elastic member 185 is prevented from occurring between the first plate part 181 and the second plate part 182.

Further, the elastic member 185 is provided with the thick wall part 185*d* which is compressively deformed around the protruded part 185*b* and thus a high degree of an impact absorption effect and a high degree of a vibration proof effect are obtained by the elastic member 185.

Further, a face on the rear side in the optical axis direction of the elastic member 185 is provided with a recessed part 185*s* which is recessed toward the movable body 3 at a position overlapping with the hole 181*a*. Therefore, when an impact toward the rear side in the optical axis direction is applied to the movable body 3, a stress applied to the second plate part 182 through the elastic member 185 is relaxed.

In the optical unit 100 in this embodiment, when the optical device 1000 shown in FIG. 1 is shaken, the shake is detected by a gyroscope and the host control section controls the shake correction drive mechanism 500 based on a detection result by the gyroscope. In other words, a drive current for cancelling the shake which is detected by the gyroscope is supplied to the coil parts 560 of the sheet-shaped coil body 550 through the flexible circuit board 410 and the flexible circuit board 420. As a result, the "X"-side shake correction drive mechanism 500*x* swings the photographing unit 1 around the "Y"-axis with the swing support point 180 as a swing center. Further, the "Y"-side shake correction drive mechanism 500*y* swings the photographing unit 1 around the "X"-axis with the swing support point 180 as a swing center. Further, when the swing around the "X"-axis and the swing around the "Y"-axis of the photographing unit 1 are combined with each other, the photographing unit 1 is displaced over the entire "X-Y" plane. Accordingly, all shakes occurred in the optical unit 100 can be corrected surely. When the photographing unit 1 is to be driven, the displacement of the photographing unit 1 is monitored by the first photo reflector 580 and the second photo reflector 590 shown in FIG. 5.

As shown in FIGS. 3(*a*) and 3(*b*), FIG. 5 and the like, in the optical unit 100 in this embodiment, one end part of the flexible circuit board 410 is connected with the circuit board 15 of the photographing unit 1. In a case that the photographing unit 1 is to be swung, when the flexible circuit board 410 applies a load to the photographing unit 1, an appropriate swing of the photographing unit 1 may be disturbed.

In order to prevent this problem, the main body portion 415 of the flexible circuit board 410 which is located on an outer side of the optical unit 100 is formed in a wide width so as to be capable of mounting a connector 490 and being connected with the flexible circuit board 420. However, a portion of the flexible circuit board 410 which is located on an inner side of the optical unit 100 is formed in two strip-shaped portions 411 whose width dimension is narrower than the main body portion 415. Therefore, there is no problem to make the swing support point 180 abut with the movable body 3. Further, a portion of the flexible circuit board 410 which is located on the inner side of the optical unit 100 is formed to be two strip-shaped portions 411 whose width dimension is narrow and thus the rigidity of the strip-shaped portion 411 is relaxed. Therefore, the strip-shaped portion of the flexible circuit board 410 is capable of following a shake of the movable body 3 smoothly and thus a large load is not applied to the movable body 3.

Further, the strip-shaped portion 411 is extended from one side "+Y" in the "Y"-axis direction toward the other side "−Y" and then, the strip-shaped portion 411 is folded back toward the one side "+Y" and, after that, an end part of the strip-shaped portion 411 is folded back along an edge of the circuit board 15 so as to be directed toward a circuit board face on the object side of the circuit board 15 and fixed. Therefore, since the flexible circuit board 410 is provided with the folded-back portion 413 between the main body portion 415 disposed on the outer side and the portion fixed to the circuit board 15 and thus its dimension is long. Accordingly, the strip-shaped portion of the flexible circuit board 410 is capable of following a shake of the photographing unit 1 smoothly and thus a large load is not applied to the movable body 3.

In addition, the folded-back portion 413 of the flexible circuit board 410 is located at the same height position as the swing center of the movable body 3 in the swing support point 180 (abutting position of the projected portion 185*g* with the movable body 3). Therefore, when the movable body 3 is swung, the displacement of the strip-shaped portion 411 is restrained small. Accordingly, affection of the flexible circuit board 410 applied to the movable body 3 is reduced, the movable body 3 is swung with a high degree of accuracy.

In the embodiments described above, at least an embodiment of the present invention is, as an example, applied to the optical unit 100 which is used in a cell phone with a camera. However, at least an embodiment of the present invention may be applied to the optical unit 100 which is used in a thin digital camera or the like. Further, in the embodiment described above, a lens drive mechanism and the like are structured in the photographing unit 1. However, at least an embodiment of the present invention may be applied to a fixed focus type optical unit in which the lens drive mechanism is not mounted on the photographing unit 1.

In addition, other than a cell phone, a digital camera and the like, the optical unit 100 with a shake correcting function to which at least an embodiment of the present invention is applied may be fixed in an apparatus such as a refrigerator in which vibration is occurred in a certain interval and mounted so as to be capable of being remote controlled. According to the apparatus, a service can be provided in which information in the inside of the refrigerator is obtained at a visit place, for example, at the time of shopping. According to this service, the camera system is provided with an attitude stabilizing device, a stable image can be transmitted even when vibration may occur in the refrigerator. Further, this device may be fixed to a device such as a bag, a satchel or a cap of a child and a student which is carried at a time of commuting or attending school. In this case, states of surroundings are photographed at a constant interval and, when the image is transmitted to a predetermined server, the parent or the like watches the image at a remote place to secure security of the child. In this application, without conscious of a camera, a clear image is photographed even when vibration occurs at the time of moving. Further, when a GPS is mounted in addition to a camera module, the position of a target person can be obtained simultaneously and thus, when an accident occurs, its position and situation can be confirmed immediately. In addition, when the optical unit 100 with a shake correcting function to which at least an embodiment of the present invention is applied is mounted at a position which is capable of photographing toward a front side in a car, it can be used as a drive recorder. Further, it may be structured that the optical unit 100 with a shake correcting function to which at least an embodiment of the present invention is applied is mounted at a position which is capable of photographing toward a front side in a car and a front side image is photographed automatically at a constant interval, which is automatically transmitted to a predetermined server. Further, when this image is distributed while interlocking with traffic jam information in the VICS (Vehicle Information and Communication System) of a car navigation system, the situation of a traffic jam can be provided further in detail. According to this service, similarly to a drive recorder mounted on a car, the situation when an accident has occurred can be recorded by a third person of passer-by without intention to utilize an inspection of the situation. Further, a clear image can be acquired without affected by vibration of a car. In a case of the application, when a power supply is turned on, a command signal is outputted to the control section and the shake control is started on the basis of the command signal.

Further, the optical unit 100 with a shake correcting function to which at least an embodiment of the present invention is applied may be applied to shake correction of an optical device from which a light beam is emitted such as a laser beam pointer, a portable or on-vehicle projection display device and direct viewing type display device. Further, in observation with high magnification such as an astronomical telescope system or a binocular system, the optical unit 100 may be used to observe without using an auxiliary locking device such as three-legged supports. In addition, when at least an embodiment of the present invention is applied to a rifle or a turret of a tank, its attitude can be stabilized against vibration at the time of trigger and thus hitting accuracy can be enhanced.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correcting function comprising:
   a fixed body;
   a movable body which holds an optical element;
   a swing support point which supports the movable body at a position between a rear end portion in an optical axis direction of the movable body and the fixed body and configured so that the movable body is swingable;
   a plate-shaped spring member which is connected with the fixed body and the movable body on a front side in the optical axis direction with respect to the swing support point, the plate shaped-spring member being configured to urge the movable body toward the swing support point;
   a shake correction drive mechanism configured to swing the movable body on the front side in the optical axis direction with respect to the spring member with the swing support point as a swing center;
   a stopper mechanism in which a protruded part protruded from the movable body is capable of abutting with the fixed body between the shake correction drive mechanism and the swing support point in the optical axis direction for determining a movable range when the movable body is displaced in a direction perpendicular to the optical axis direction;
   the protruded part is provided in the movable body;
   the shake correction drive mechanism comprises a sheet-shaped coil body disposed on the fixed body and a permanent magnet disposed on the movable body, and the protruded part is protruded from the movable body toward the sheet-shaped coil body with respect to the permanent magnet so as to be capable of abutting with the sheet-shaped coil body;
   the permanent magnet is capable of abutting with the sheet-shaped coil body when the movable body is swung for determining a swingable range of the movable body;
   the sheet-shaped coil body is structured so that a coil part is formed in a multi-layer structure through an insulation film;
   the movable body comprises a frame-shaped holder which holds the permanent magnet and a frame-shaped stopper member having the protruded part which is fixed to a rear side end face in the optical axis direction of the holder;
   the movable body is formed in a rectangular shape when viewed in the optical axis direction; and
   the protruded part comprises a first protruded part and a second protruded part separated from the first protruded part in an extending direction of each side portion of four side portions of the rectangular shape.

2. The optical unit with a shake correcting function according to claim 1, wherein the protruded part is provided between the shake correction drive mechanism and the spring member in the optical axis direction.

3. The optical unit with a shake correcting function according to claim 1, wherein
   the protruded part is capable of abutting with a portion of the insulation film of the sheet-shaped coil body which is located at a lower side with respect to the coil part.

4. The optical unit with a shake correcting function according to claim 3, wherein
   the movable body is formed in a rectangular shape when viewed in the optical axis direction and four outer faces of the movable body are respectively fixed with a flat plate-shaped permanent magnet, and
   the fixed body is formed in a rectangular shape when viewed in the optical axis direction and the sheet-shaped coil body is disposed on an inner face of a rectangular tube-shaped body part of the fixed body.

5. The optical unit with a shake correcting function according to claim 1, wherein an inner side face of the holder and an inner side face of the stopper member are located on a same imaginary plane that is parallel to the optical axis direction.

6. The optical unit with a shake correcting function according to claim 5, wherein the plate-shaped spring member is connected with the movable body through the stopper member.

7. The optical unit with a shake correcting function according to claim 1, wherein
the plate-shaped spring member is provided with a fixed side connecting part connected with the fixed body, a movable side connecting part connected with the frame-shaped stopper member, and a plurality of arm parts extended between the movable side connecting part and the fixed side connecting part, and
the movable side connecting part is fixed to a rear side end face in the optical axis direction of the stopper member.

8. The optical unit with a shake correcting function according to claim 1, further comprising an elastic member having a projected portion protruding toward the movable body which is provided at a portion of the fixed body that is oppositely disposed to a rear end portion in the optical axis direction of the movable body,
wherein the swing support point is structured so that the projected portion of the elastic member is abutted with the rear end portion in the optical axis direction of the movable body.

* * * * *